United States Patent [19]
Koenneker

[11] Patent Number: 4,947,707
[45] Date of Patent: Aug. 14, 1990

[54] ARRANGEMENT FOR DECOUPLING THE TORSIONAL VIBRATIONS IN A GEAR TRANSMISSION

[75] Inventor: Reinhard Koenneker, Moensheim, Fed. Rep. of Germany

[73] Assignee: Dr. Ing. h.c.f. Porsche Aktiengesellschaft, Fed. Rep. of Germany

[21] Appl. No.: 245,641

[22] Filed: Sep. 19, 1988

[30] Foreign Application Priority Data

Oct. 19, 1987 [DE] Fed. Rep. of Germany ....... 3735335

[51] Int. Cl.⁵ ............................................. F16F 15/10
[52] U.S. Cl. ......................................... 74/574; 74/403
[58] Field of Search .............. 74/409, 411, 445, 572, 74/573 R, 574, 443

[56] References Cited

U.S. PATENT DOCUMENTS

| | | | |
|---|---|---|---|
| 2,663,198 | 12/1953 | Cairnes | 74/409 |
| 2,966,806 | 1/1961 | Luning | 74/409 |
| 3,359,819 | 12/1967 | Veillette et al. | 74/409 |
| 3,960,209 | 6/1976 | Neubrand | 74/443 X |
| 4,573,374 | 3/1986 | Koshimo et al. | 74/574 |
| 4,664,624 | 5/1987 | Dufresne | 74/574 X |
| 4,671,129 | 6/1987 | Lovrenich | 74/409 X |
| 4,700,582 | 10/1987 | Bessette | 74/443 X |

FOREIGN PATENT DOCUMENTS

| | | | |
|---|---|---|---|
| 1269910 | 4/1961 | France | 74/409 |
| 0094668 | 6/1983 | Japan | 74/443 |
| 0020962 | 1/1987 | Japan | 74/443 |
| 0215165 | 9/1987 | Japan | 74/443 |

Primary Examiner—Vinh T. Luong
Attorney, Agent, or Firm—Evenson, Wands, Edwards, Lenahan & McKeown

[57] ABSTRACT

A toothed springy decoupling gear set consisting of a center gear and of two coaxial split gears abutting on both sides thereof serve as arrangement for decoupling torsional vibrations in a gear transmission, for example, in a control transmission of a reciprocating piston engine. Drawsprings located tangentially in the center gear protrude with their two spring ends out of the center gear and are suspended at the left and at the right split gear.

13 Claims, 1 Drawing Sheet

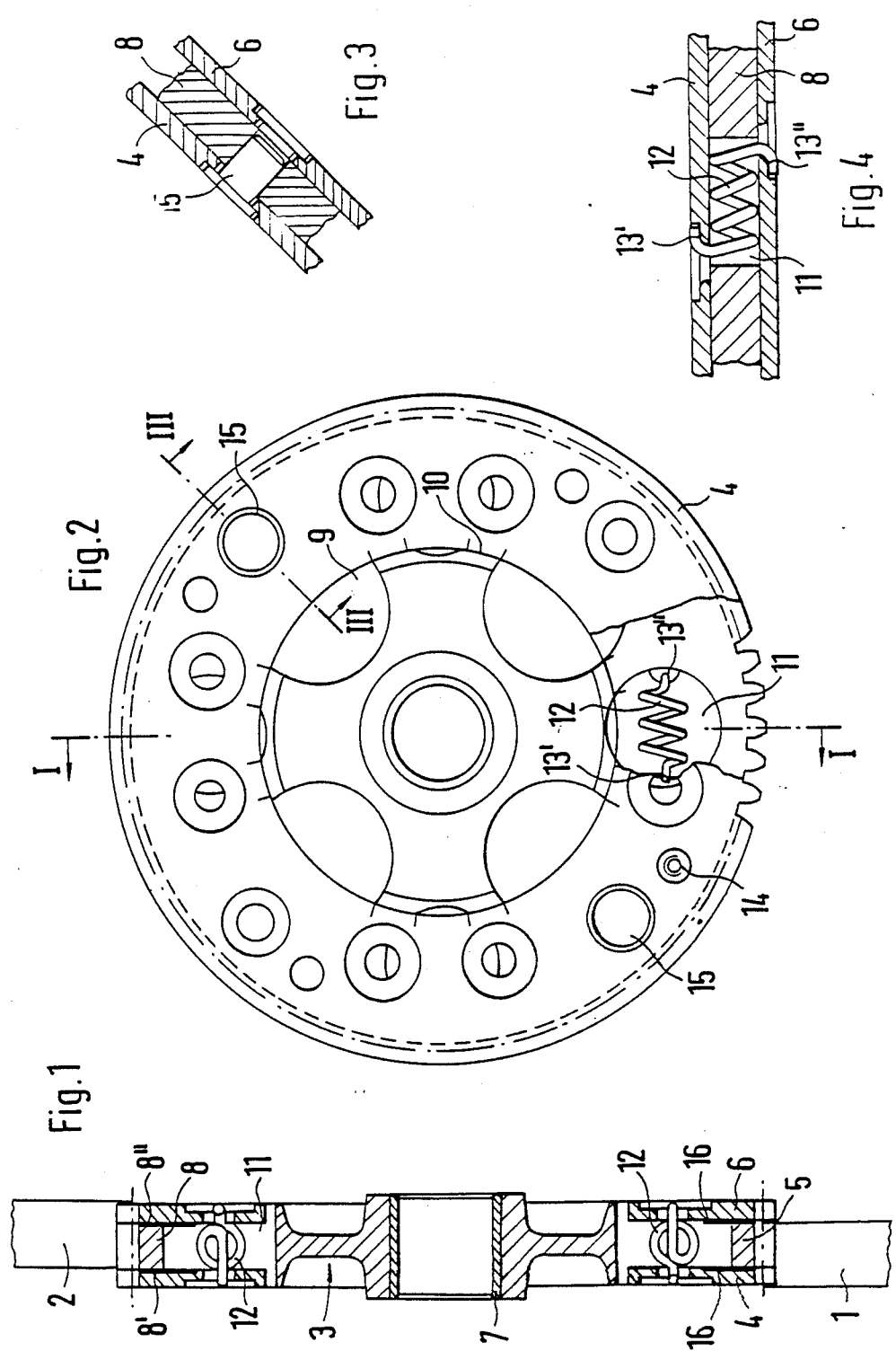

ARRANGEMENT FOR DECOUPLING THE TORSIONAL VIBRATIONS IN A GEAR TRANSMISSION

BACKGROUND AND SUMMARY OF THE INVENTION

The present invention relates to an arrangement for decoupling torsional vibrations in a gear transmission, especially in a control transmission between a crankshaft and a cam shaft of a reciprocating piston engine which consists of spur gears, in which a decoupling gear set meshing with the driving and driven gears is arranged between these two gears, and in which the decoupling gear set is composed of three coaxial gears arranged adjacent one another and mutually stressed by springs.

In gear transmissions which serve for the torque transmission, frequently torsional vibrations are introduced from the driving side or the driven side. These torsional vibrations lead to an alternate abutment at the tooth flanks. They cause clatter noises and at times also the breakage of teeth. Owing to gas- and mass-forces at the crank drive, such torsional vibrations occur particularly pronouncedly at crankshafts of reciprocating piston engines. If a control transmission consisting of spur gears is used between the crankshaft and the cam shaft, which is more advantageous for a precise control than a chain or belt drive, then these torsional vibrations are introduced into the control transmission. As at the same time torsional vibrations may also reach the control transmission from the cam shaft side, both torsional vibrations may overlap in one place within the control transmission in such an unfavorable manner that transmission shafts break. A decoupling arrangement for torsional vibrations is disclosed in the U.S. Pat. No. 2,966,806; it is referred to therein at times as "anti-backlash gear", a designation which is also utilized frequently in the German technical literature. A decoupling gear set is arranged between a driving gear and a driven gear which consists of three coaxial gears disposed one adjacent the other and mutually stressed by springs. The left split gear and the center gear mesh with the driving gear while the right split gear and the center gear mesh with the driven gear. The right split gear is stressed with respect to the center gear by one spring while the right split gear is stressed with respect to the center gear by a further spring. In case of a torsional vibration deflection at one of the split gears, the spring is stressed and returns the same into its relative starting position without conducting the torsional vibration through the decoupling arrangement.

It is therefore an object of the present invention to so improve a decoupling arrangement of the aforementioned type that it can be manufactured and assembled in a cost-favorable manner and is more effective in its function.

The underlying problems are solved according to the present invention in that drawsprings are arranged in apertures of the center gear disposed tangential to the latter which with their one spring ends are suspended at the left split gear and with the other spring ends at the right split gear. If the gears of the decoupling gear set are mutually stressed or spring-loaded by drawsprings, a torsional damping is achieved simultaneously with the torsional vibration decoupling because the end surfaces of the gear are placed against one another by the drawsprings. Such a gear set can be manufactured also cost-favorably and can be easily installed.

BRIEF DESCRIPTION OF THE DRAWINGS

These and other objects, features and advantages of the present invention will become more apparent from the following description when taken in connection with the accompanying drawing which shows, for purposes of illustration only, one embodiment in accordance with the present invention, and wherein:

FIG. 1 is a spur gear transmission and a cross-sectional view through a decoupling gear set in accordance with the present invention taken along line I—I of FIG. 2;

FIG. 2 is a front elevational view of the decoupling gear set in accordance with the present invention;

FIG. 3 is a cross-sectional view taken along line III—III of FIG. 2; and

FIG. 4 is a partial cross-sectional view illustrating an eccentric spring stressing.

DETAILED DESCRIPTION OF THE DRAWINGS

Referring now to the drawing wherein like reference numerals are used throughout the various views to designate like parts, a decoupling gear set generally designated by reference numeral 3 is arranged between a driving gear 1 and a driven gear 2 of a control transmission for a reciprocating piston engine, which serves for decoupling torsional vibrations that initiate at the crankshaft and at the camshaft driven thereby. The decoupling gear set 3 is composed of three mutually coaxial gears spring-loaded or stressed with respect to one another by springs and abutting end-face at one another, namely, of a left split gear 4, of a center gear 5 and of a right split gear 6. The center gear 5 and the left split gear 4 mesh with the driving gear 1 while the center gear 5 and the right split gear 6 are in meshing engagement with the driven gear 2. The center gear 5 is supported as a loose intermediate gear at the reciprocating piston engine in a slide bearing 7 (FIG. 1). For purposes of reducing weight, the wheel disk 8 of the center gear 5 is provided with four semi-circularly shaped apertures 9 distributed over the circumference. At its two end faces 8' and 8", the wheel disk 8 is turned for receiving the split gears 4 and 6. The split gears are rotationally movably supported on the thus-constructed four star-shaped centering extensions 10 (FIG. 2). Four coil springs 12 are disposed in four apertures 11 of the wheel disk 8 tangential to the center gear 5 whose bent-off spring ends 13' and 13" are suspended in bores of the left split gear 4, respectively, of the right split gear 5 and thereby mutually stress or spring-load the same in the circumferential direction. At the same time, the coil springs 12 exert an axial force on the split gears 4 and 6 and retain the same in abutment at the end faces 8' and 8" of the wheel disk 8 (FIG. 4).

In order to be able to assemble the decoupling gear set easily at the control transmission, it is secured in the prestressed rotational position by means of a pin 14 (FIG. 2) axially extending through the split gears 4 and 6 and the center gear 5. After sliding the decoupling gear set 3 into the teeth of the driving gear 1 and the driven gear 2, this pin 14 is removed. Coil springs 12 cause abutment of the tooth flanks of the left split gear 4 at the driving gear 1 and the tooth flanks of the right split gear 6 at the driven gear 2 without clearance whereas the center gear 5 engages into the driving gear 1 and the driven gear 2 with tooth clearance.

If a torsional vibration is now introduced into the decoupling gear set 3 either from the crankshaft by way of the driving gear 1 or from the cam shaft by way of the driven gear 2, then this has as a consequence that the split gears 4 and 6 are rotated relative to one another and the coil springs 12 are correspondingly stressed more strongly. A torsional vibration decoupling takes place by this equalization movement which is so effective that no significant vibration deflections are introduced through the decoupling gear set 3 into the following transmission gears.

Additionally, a vibration-damping is achieved in that the split gears 4 and 6 frictionally engage during the equalization movement at the end faces 8' and 8" of the center gear 5. The friction force can thereby be preselected by selection of the spring force of the coil springs 12. The friction damping is further increased in that friction linings 16 are inserted between the split gears 4 and 6 and the center gear 5.

Two arresting bolts 15 (FIGS. 2 and 3) which are inserted end-face through the split gears 4 and 6 and are retained in the wheel disk 8 of the center gear prevent the decoupling gear set 3 from sliding apart axially in case of fatigue or breakage of the coil springs 12.

While I have shown and described only one embodiment in accordance with the present invention, it is understood that the same is not limited thereto but is susceptible of numerous changes and modifications as known to those skilled in the art, and we therefore do not wish to be limited to the details shown and described herein but intend to cover all such changes and modifications as are encompassed by the scope of the appended claims.

I claim:

1. An arrangement for decoupling torsional vibrations in a gear transmission comprising a driving gear, a driven gear, a decoupling gear set means meshing with both the driving and driven gear, said decoupling gear set means including three split gears arranged coaxially adjacent one another and mutually stressed by spring means, one of said gears being a left split gear, another a center gear and still another a right split gear, the spring means being in the form of drawspring means arranged in apertures of the center gear and disposed tangentially thereto which are suspended with their one spring ends at the left split gear and with the other spring ends at the right split gear, wherein the drawspring means are coil springs having two bent-off spring ends whose suspension points are disposed eccentrically to the longitudinal axis of the coil springs;

2. An arrangement according to claim 1, wherein all three gears of the decoupling gear set means abut endface at one another.

3. An arrangement for decoupling torsional vibrations in a gear transmission comprising a driving gear, a driven gear, a decoupling gear set means meshing with both the driving and driven gear, an decoupling gear set means including three split gears arranged coaxially adjacent one another and mutually stressed by spring means, one of said gears being a left split gear, another a center gear and still another a right split gear, the spring means being in the form of drawspring means arranged in apertures of the center gear and disposed tangentially thereto which are suspended with their one spring ends at the left split gear and with the other spring ends at the right split gear wherein the decoupling gear means includes four coil springs distributed symmetrically along its circumference.

4. An arrangement for decoupling torsional vibrations in a gear transmission comprising a driving gear, a driven gear, a decoupling gear set means meshing with both the driving and driven gear, an decoupling gear set means including three split gears arranged coaxially adjacent one another and mutually stressed by spring means, one of said gears being a left split gear, another a center gear and still another a right split gear, the spring means being in the form of drawspring means arranged in apertures of the center gear and disposed tangentially thereto which are suspended with their one spring ends at the left split gear and with the other spring ends at the right split gear, wherein the drawspring means are coil springs having two bent-off spring ends whose suspension points are disposed eccentrically to the longitudinal axis of the coil springs, wherein all three gears of the decoupling gear set means abut endface at one another and wherein at least some of the gears are provided with friction linings at their end faces.

5. An arrangement according to claim 4, further comprising arresting bolt means for securing the axial position of the split gears to the center gear.

6. An arrangement according to claim 5, wherein the split gears are supported on star-shaped centering extensions of the center gear.

7. An arrangement according to claim 6, wherein the decoupling gear set means includes four coil springs distributed symmetrically along its circumference.

8. An arrangement according to claim 6, wherein the center gear is approximately twice as wide as the right, respectively, the left split gear.

9. An arrangement for decoupling torsional vibrations in a gear transmission comprising a driving gear, a driven gear, a decoupling gear set means meshing with both the driving and driven gear, said decoupling gear set means including three split gears arranged coaxially adjacent one another and mutually stressed by spring means, one of said gears being a left split gear, another a center gear and still another a right split gear, the spring means being in the form of drawspring means arranged in apertures of the center gear and disposed tangentially thereto which are suspended with their one spring ends at the left split gear and with the other spring ends at the right split gear, wherein for facilitating installation the relative position of the split gears in operable to be arrested by means of a pin.

10. An arrangement for decoupling torsional vibrations in a gear transmission comprising a driving gear, a driven gear, a decoupling gear set means meshing with both the driving and driven gear, said decoupling gear set means including three split gears arranged coaxially adjacent one another and mutually stressed by spring means, one of said gears being a left split gear, another a center gear and still another a right split gear, the spring means being in the form of drawspring means arranged in apertures of the center gear and disposed tangentially thereto which are suspended with their one spring ends at the left split gear and with the other spring ends at the right split gear, further comprising arresting bolt means for securing the axial position of the split gears to the center gear.

11. An arrangement for decoupling torsional vibrations in a gear transmission comprising a driving gear, a driven gear, a decoupling gear set means meshing with both the driving and driven gear, an decoupling gear set means including three split gears arranged coaxially adjacent one another and mutually stressed by spring means, one of said gears being a left split gear, another a center gear and still another a right split gear, the spring means being in the form of drawspring means arranged in apertures of the center gear and disposed tangentially thereto which are suspended with their one spring ends at the left split gear and with the other spring ends at the right split gear, wherein all three gears of the decoupling gear set means abut end-face at one another, and wherein at least some of the gears are provided with friction linings at their end faces.

12. An arrangement for decoupling torsional vibrations in a gear transmission comprising a driving gear, a driven gear, a decoupling gear set means meshing with both the driving and driven gear, said decoupling gear set means including three split gears arranged coaxially adjacent one another and mutually stressed by spring means, one of said gears being a left split gear, another a center gear and still another a right split gear, the spring means being in the form of drawspring means arranged in apertures of the center gear and disposed tangentially thereto which are suspended with their one spring ends at the left split gear and with the other spring ends at the right split gear, wherein at least some of the gears are provided with friction linings at their end faces.

13. An arrangement for decoupling torsional vibrations in a gear transmission comprising a driving gear, a driven gear, a decoupling gear set means meshing with both the driving and driven gear, said decoupling gear set means including three split gears arranged coaxially adjacent one another and mutually stressed by spring means, one of said gears being a left split gear, another a center gear and still another a right split gear, the spring means being in the form of drawspring means arranged in apertures of the center gear and disposed tangentially thereto which are suspended with their one spring ends at the left split gear and with the other spring ends at the right split gear, wherein the decoupling gear set means includes four coil springs distributed symmetrically along its circumference.

* * * * *